US008024368B2

(12) United States Patent
Roy et al.

(10) Patent No.: US 8,024,368 B2
(45) Date of Patent: *Sep. 20, 2011

(54) GENERATING XML INSTANCES FROM FLAT FILES

(75) Inventors: Indroniel Deb Roy, Hyderabad (IN); Shinji Yoshida, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 604 days.

This patent is subject to a terminal disclaimer.

(21) Appl. No.: 11/297,172

(22) Filed: Dec. 7, 2005

(65) Prior Publication Data

US 2007/0083538 A1    Apr. 12, 2007

(51) Int. Cl.
*G06F 17/30* (2006.01)

(52) U.S. Cl. ........ 707/802; 707/803; 707/804; 707/809; 707/810

(58) Field of Classification Search .................. None
See application file for complete search history.

(56) References Cited

U.S. PATENT DOCUMENTS

| 5,295,261 | A | 3/1994 | Simmonetti |
| 5,404,513 | A | 4/1995 | Powers et al. |
| 5,467,471 | A | 11/1995 | Bader |
| 5,680,614 | A | 10/1997 | Bakuya et al. |
| 5,724,577 | A | 3/1998 | Exley et al. |
| 5,734,887 | A | 3/1998 | Kingberg et al. |
| 5,878,415 | A | 3/1999 | Olds |
| 5,974,407 | A | 10/1999 | Sacks |
| 5,987,506 | A | 11/1999 | Carter et al. |
| 5,999,941 | A | 12/1999 | Andersen |
| 6,012,067 | A | 1/2000 | Sarkar |
| 6,038,563 | A | 3/2000 | Bapat et al. |
| 6,055,544 | A | 4/2000 | DeRose et al. |
| 6,061,684 | A | 5/2000 | Glasser et al. |
| 6,128,610 | A | 10/2000 | Srinivasan et al. |
| 6,141,655 | A | 10/2000 | Johnson et al. |
| 6,154,741 | A | 11/2000 | Feldman |
| 6,199,195 | B1 | 3/2001 | Goodwin et al. |
| 6,208,993 | B1 | 3/2001 | Shadmone |
| 6,236,988 | B1 | 5/2001 | Aldred |
| 6,240,407 | B1 | 5/2001 | Chang et al. |
| 6,263,332 | B1 | 7/2001 | Nasr et al. |
| 6,269,380 | B1 | 7/2001 | Terry et al. |

(Continued)

FOREIGN PATENT DOCUMENTS

EP    1 241 589 A2    9/2002

(Continued)

OTHER PUBLICATIONS

U.S. Appl. No. 10/944,171, filed Sep. 16, 2004, Office Action Mailing date Apr. 19, 2007.

(Continued)

*Primary Examiner* — Baoquoc To
(74) *Attorney, Agent, or Firm* — Hickman Palermo Truong & Becker LLP (57) ABSTRACT

In order to parse a flat file to create an XML instance, information about the data and its hierarchy is captured in an XML schema definition. Once the data structure is defined in the Schema, the parsing instructions for the flat file are introduced in the schema so that after producing an XML instance from a schema definition, the instance may be populated with live data from the flat file.

24 Claims, 6 Drawing Sheets

U.S. PATENT DOCUMENTS

| | | | |
|---|---|---|---|
| 6,279,006 | B1 | 8/2001 | Shigemi et al. |
| 6,279,007 | B1 | 8/2001 | Uppala |
| 6,298,349 | B1 | 10/2001 | Toyoshima et al. |
| 6,343,287 | B1 | 1/2002 | Kumar et al. |
| 6,356,920 | B1 | 3/2002 | Vandersluis |
| 6,366,934 | B1 | 4/2002 | Cheng et al. |
| 6,370,537 | B1 | 4/2002 | Gilbert et al. |
| 6,418,448 | B1 | 7/2002 | Sarkar |
| 6,438,540 | B2 | 8/2002 | Nasr et al. |
| 6,449,620 | B1 | 9/2002 | Draper et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,571,231 | B2 | 5/2003 | Sedlar |
| 6,574,655 | B1 | 6/2003 | Libert et al. |
| 6,584,459 | B1 | 6/2003 | Chang et al. |
| 6,604,100 | B1 | 8/2003 | Fernandez et al. |
| 6,636,845 | B2 | 10/2003 | Chau et al. |
| 6,643,633 | B2 | 11/2003 | Chau et al. |
| 6,675,354 | B1 * | 1/2004 | Claussen et al. ............ 715/513 |
| 6,718,322 | B1 | 4/2004 | Brye |
| 6,721,727 | B2 | 4/2004 | Chau et al. |
| 6,725,212 | B2 | 4/2004 | Couch et al. |
| 6,754,661 | B1 | 6/2004 | Hallin et al. |
| 6,772,350 | B1 | 8/2004 | Belani et al. |
| 6,779,152 | B1 * | 8/2004 | Conner et al. ............... 715/509 |
| 6,785,673 | B1 | 8/2004 | Fernandez et al. |
| 6,826,727 | B1 | 11/2004 | Mohr et al. |
| 6,836,778 | B2 | 12/2004 | Manikutty et al. |
| 6,836,857 | B2 | 12/2004 | Ten-Hove et al. |
| 6,871,204 | B2 | 3/2005 | Krishnaprasad et al. |
| 7,031,956 | B1 | 4/2006 | Lee et al. |
| 7,194,402 | B2 * | 3/2007 | Poplawski ........................ 704/3 |
| 2002/0015042 | A1 | 2/2002 | Robotham et al. |
| 2002/0035606 | A1 | 3/2002 | Kenton |
| 2002/0038358 | A1 | 3/2002 | Sweatt, III et al. |
| 2002/0056025 | A1 | 5/2002 | Qiu et al. |
| 2002/0073019 | A1 | 6/2002 | Deaton |
| 2002/0116371 | A1 | 8/2002 | Dodds et al. |
| 2002/0116457 | A1 | 8/2002 | Eshleman et al. |
| 2002/0120685 | A1 | 8/2002 | Srivastava et al. |
| 2002/0123993 | A1 | 9/2002 | Chau et al. |
| 2002/0124100 | A1 | 9/2002 | Adams |
| 2002/0133484 | A1 | 9/2002 | Chau et al. |
| 2002/0143512 | A1 | 10/2002 | Shamoto et al. |
| 2002/0156772 | A1 | 10/2002 | Chau et al. |
| 2002/0156811 | A1 | 10/2002 | Krupa |
| 2002/0169788 | A1 | 11/2002 | Lee et al. |
| 2002/0184188 | A1 | 12/2002 | Mandyam et al. |
| 2002/0184401 | A1 | 12/2002 | Kadel, Jr. et al. |
| 2002/0198874 | A1 | 12/2002 | Nasr et al. |
| 2003/0004937 | A1 | 1/2003 | Salmenkaita et al. |
| 2003/0009361 | A1 | 1/2003 | Hancock et al. |
| 2003/0014397 | A1 | 1/2003 | Chau et al. |
| 2003/0065659 | A1 | 4/2003 | Agarwal et al. |
| 2003/0093672 | A1 | 5/2003 | Cichowlas |
| 2003/0101194 | A1 | 5/2003 | Rys et al. |
| 2003/0131073 | A1 | 7/2003 | Lucovsky et al. |
| 2003/0140308 | A1 | 7/2003 | Murthy et al. |
| 2003/0158897 | A1 | 8/2003 | Ben-Natan et al. |
| 2003/0182624 | A1 | 9/2003 | Large |
| 2003/0204481 | A1 | 10/2003 | Lau |
| 2004/0043758 | A1 | 3/2004 | Sorvari et al. |
| 2004/0064466 | A1 | 4/2004 | Manikutty et al. |
| 2004/0148278 | A1 | 7/2004 | Milo et al. |
| 2004/0176958 | A1 | 9/2004 | Salmenkaita et al. |
| 2004/0220912 | A1 | 11/2004 | Manikutty et al. |
| 2004/0220927 | A1 | 11/2004 | Murthy et al. |
| 2004/0225680 | A1 | 11/2004 | Cameron et al. |
| 2004/0267760 | A1 | 12/2004 | Brundage et al. |
| 2005/0010896 | A1 | 1/2005 | Meliksetian et al. |
| 2005/0050058 | A1 | 3/2005 | Jain et al. |
| 2005/0050092 | A1 | 3/2005 | Jain et al. |
| 2005/0144556 | A1 | 6/2005 | Petersen et al. |
| 2005/0289125 | A1 | 12/2005 | Liu et al. |
| 2006/0031233 | A1 | 2/2006 | Liu et al. |
| 2006/0206502 | A1 * | 9/2006 | Gaurav et al. ................. 707/100 |
| 2006/0259519 | A1 * | 11/2006 | Yakushev et al. ............. 707/201 |
| 2007/0038649 | A1 | 2/2007 | Agrawal et al. |

FOREIGN PATENT DOCUMENTS

| | | |
|---|---|---|
| WO | WO 00/49533 | 8/2000 |
| WO | WO 01/42881 A2 | 6/2001 |
| WO | WO 01/59602 A1 | 8/2001 |
| WO | WO 01/61566 A1 * | 8/2001 |

OTHER PUBLICATIONS

U.S. Appl. No. 11/034,490, filed Jan. 12, 2005, Office Action Mailing Date Apr. 23, 2007.

U.S. Appl. No. 10/259,278, filed Sep. 27, 2002.

U.S. Appl. No. 11/202,463, filed Aug. 11, 2005.

U.S. Appl. No. 11/246,039, filed Oct. 7, 2005.

U.S. Appl. No. 11/246,001, filed Oct. 7, 2005.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Josephine Cheng, et al., "IBM DB2 XML Extender, An end-to-end solution for storing and retrieving XML documents.," IEEE, ICDE '00 . Conference, San Diego, Feb. 2000, 128 pages.

R. Bourret et al.: A Generic Load/Extract Utility for Data Transfer Between XML Documnts and Relational Databases, Jun. 8-9, 2000, IEEE Computing Soc., pp. 134-143.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, 20 (Jun. 1991), No. 2, New York, US, XP 000364619, pp. 50-59.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

International Preliminary Examination Report, Application No. PCT/US02/30783, pp. 1-14.

J. Shanmugasundaram, et al. "Querying XML Views of Relational Data," Proceedings of the 27th Very Large Databases Conference, Rome, Italy, Sep. 2001, pp. 261-270.

Current Claims in PCT/US02/30783, pp. 1-8.

Albrecht Schmidt et al., "Efficient Relational Storage and Retrieval of XML Documents," CWI, The Netherlands (pp. 1-6).

Sandeepan Banerjee, Oracle Corporation, "Oracle 9i 'Project XDB'—The XML Database," Oracle-2001, (pp. 1-18).

Sandeepan Banerjee, et al., "Oracle8i—The XML Enabled Data Management System," Oracle Corporation, Mar. 2000 IEEE pp. 561-568.

Ramon Lawrence et al., "Integrating Relational Database Schemas Using a Standardized Dictionary," 2001, ACM (pp. 225-230).

Latifur Khan et al., "A Performance Evaluation of Storing XML Data in Relational Database Management Systems," ACM-2001 (pp. 31-38).

Philip Bohannon, et al., "From XML Schema to Relations: A Cost-Based Approach to XML Storage," Bell Laboratories, IEEE, 2002, Proceedings of the 18th International Conference on Data Engineering (ICDE'02), 12 pages.

Raghu Ramakrishnan, et al., "SRQL: Sorted Relational Query Language," Jul. 1-3, 1998, IEEE pp. 84-95.

Daniela Florescu et al., "A Performance Evaluation of Alternative Mapping Schemes for Storing XML Data in a Relational Database," May 1999, XP-002168318, pp. 1-31.

International Preliminary Examination Report, Application No. PCT/US03/35551, pp. 1-17.
Written Opinion, Application No. PCT/US03/35551.
Current Claims in PCT/US03/35551, pp. 1-4.
Melton, John, "ISO-ANSI Working Draft, XML-Related Specifications (SQL/XML)," WG3: DRS-020, H2-2002-365, Aug. 2002, 154 pages.
Oracle Corporation, "Oracle9i XML Database Developer's Guide—Oracle XML DB," Release 2 (9.2), Oct. 2002, Part No. A96620-1, pp. 4-31-4-35, 5-21-5-24 and 5-70-5-71.
W3C, "XML Schema Part 1: Structures," W3C Recommendation, May 2, 2001, <http://www.w3.org/TR/2001/Rec-xmlschema-1-20010502/>, pp. 1-203.
W3C, "XML Schema Part 2: Datatypes," W3C Recommendation, May 2, 2001, <http://www.w3.org/TR/2001/REC-xmlschema-2-20010502/>, pp. 1-146.
Ming-Ling Lo et al., "XAS: A System for Accessing Componentized, Virtual XML Documents," IEEE, 2001, pp. 493-502.
Andrea Zisman et al., "Using XML to Build Consistency Rules for Distributed Specifications," Proceedings of the Tenth International Workshop on Software Specification and Design (IWSD'00), IEEE 2000, 8 pages.
Myllymaki, Jussi, "Effective Web Data Extraction with Standard XML Technologies," WWW10, May 1-5, 2001, pp. 689-696.
Schmidt, Albrecht et al., "Why and How to Benchmark XML Databases," SIGMOND Record, vol. 3, No. 3, Sep. 2001, pp. 27-32.
Peng, Feng et al., "XPath queries on streaming data", 2003, ACM Press, pp. 431-442.
Vion-Dury, Jean-Yves, "XPath on left and right sides of rules: toward compact XML tree rewriting through node patterns", 2003, ACM Press, pp. 19-25.
Japanese Patent Office, "Notice of Grounds of Rejection", Patent application No. 533163/2003, mailed Aug. 19, 2008 / received Aug. 21, 2008, 7 pages.
Claims, Patent application No. 533163/2003, 9 pages.
Tomoharu, Asami, "Development of Database System by XML, Relaxer, and JDBC", partial English translation, XML Press, Gijutsu-Hyohron Co., Jul. 10, 2001, vol. 3, 2 pages.
Makoto, Onizuka, "XML and Database", partial English translation, XML Magazine, Shoeisha Co., Ltd., Jul. 1, 2000, vol. 10, No. 3, 1 page.
Hironobu, Koyaku, "What is brought to SQL Server 2000 by XML?", partial English translation, Enterprise Servers, IDG Japan, Dec. 1, 2000, vol. 3, No. 12, 1 page.

* cited by examiner

Fig. 1

Social Security Number, Name, Salary
123456789,Ram Singh, 100000.00
444556666,Barr Clark, 87000.00
777227878.Simi? D Roy,123000.00
998877665,Charr Lee,92000.00

*Fig. 2*

Social Security Number, Name, Salary
I23456789Ram Singh 100000.00
444556666Barr Clark 87000.00
777227878 Simi D Roy 123000.00
998877665Charr Lee 92000.00

*Fig. 3*

```
<xs:complexType narne="Employee">
        <xs:sequence>
                <xs element name="ssn" type="xs: integer"/>
                <xs :element name="name" type="name"/>
                <xs:element name="salary" type="xs:float"/>
        </xs:sequence>
</xs:complexType>
<xs:complexType name="name">
        <xs:sequence>
                <xs:element name="fname" type="xs:string"/>
                <xs:element name="lname" type="xs:string"/>
        </xs:sequence>
</xs:cornplexType>
```

*Fig. 4*

```
<xs:element name="Employee">
        <xs:complexType>
                <xs:sequence>
                        <xs:element ref="ssn"/>
                        <xs:element ref="name"/>
                        <xs:element ref="salary"/>
                </xs:sequence>
        </xs:complexType>
</xs:element>
<xs:element name="ssn" type="name"/>
<xs:element name="name" type="xs:string"/>
<xs:element name="salary" type="xs:float"/>
<xs:complexType name="name">
        <xs:sequence>
                <xs:element name="fname" type="xs:string"/>
                <xs:element name="lname" type="xs:string"/>
        </xs:sequence>
</xs:complexType>
```

Fig. 5

| CONTROL ATTRIBUTE | DESCRIPTION |
|---|---|
| t2xml:rootelem | Specifies the root element. Add this to the scheme element that is specifying as the root element. As there is only one root element in an XML instance, only one schema element that qualifies as the root of the XML instance should have this attribute. |
| CONTAINER-SPECIFIC | |
| t2xml:container | Marks a scheme element as a container ie, it will contain other elements inside it. It is similar to a record in the flat file that contains the fields inside. |
| t2xml:container_end token | Marks a container to fetch data from the file using the container and taken as a datamitter of this attribute as present in a schema element to guides the engine to get records from the flat files tp populate objects contained in that container. |
| t2xml:container_def_id | Tells about the definition id of a container. This might be a value that identifies a container. If a container does not have a particular ID to identify it, this attribute might be omitted or "generic" regent be assigned as the attribute value. |
| t2xml:container_position | Tells the position where the t2xmlcontainer_def_id might be found in the container. For the determined container case. it's the position of the object from this start of the container that holds the t2xmlcontainer_def_id." For pre-fined-length. case it's the absolute position of the t2xmlcontainer_def_id." from the start of the container. |
| t2xml:container_type | Tells the container type. ie, whether it's a determined or fixed length type of container. The only two values currently are "determined" and "fixed." |
| t2xml:object_sep | Should also be destined in the container schema statement in case of a delimited container. it tells about the object datamitter used to separate objects in a container |
| t2xml:escape_char | Marks the escape character in the container definition. |
| CONTAINER OBJECT SPECIFIC ATTRIBUTES | |
| t2xml:object | Mandatory while checking fields (objects). This attribute marks an element for a field (object representation inside a containerly accord). |
| t2xml:object_len | Mandatory if the container record consists of load-length objects (fields). This attribute should contain the exact length of the field in the text file. In case of a mismatch, parsing will fail or provide unexpected results. |
| t2xml:ignore | Sometimes the flat file may contain fields and records that must be suppressed while creating the XLM instance. If present, this flag will suppress the element in the generated XML instance. |
| t2xml:keep current | Required it an object value needs to be reused in the subsequent object value population. It just keeps the current value after populating the current object. |

GENERATING XML INSTANCES FROM FLAT FILES

CROSS REFERENCE TO RELATED APPLICATION

This application is related to and claims the benefit of priority from Indian Patent Application No. 930/KOL NP/05, filed on Oct. 7, 2005, entitled "Generating XML Instances from Flat Files—A Schema-Based Approach", the content of which is incorporated by this reference in its entirety for all purposes as if fully disclosed herein.

FIELD OF THE INVENTION

The present invention relates to XML instances, and more specifically, generating XML instances from flat files.

BACKGROUND

Enterprise applications such as banking, healthcare, and others often use flat files to import and export data between applications. Flat files contain machine-readable data that is typically encoded in printable characters. The term "flat" means that the file is not indexed. The term also implies to some that a flat file does not have a hierarchical structure; however, many flat files do have a hierarchical structure.

Data stored in a flat file is most often formatted as text delimited by a character or group of characters or based on fixed length formatting. This provides a structure for the data and a way to differentiate between sections of the data. Because they are relatively simple text files and lack an index, flat files are not easily queried nor do they provide rigorous validation functions. Further, flat files can contain a vast amount of redundant data, as data may be repeated in several locations. This wastes disk space and slows down queries. Also, data entry is time consuming because the same data often must be entered. For example, to record the sale of 500 widgets, the price, description and supplier details will have to be recorded 500 times. Moreover, delimited and fixed length flat files are not very easily interpreted by humans.

This repetition of data entry can lead to typographical errors if the same data has to be entered multiple times. Also, changes to existing data may have to be updated for each occurrence. Because of these drawbacks, and the need for flat-file based applications to interact with XML-aware applications and Web services, there is a growing need to convert flat file data to an XML format.

XML is suited for the interchange of data as XML documents are tagged, easily parsed, and can represent complex data structure. As a result, many large entities wish to convert their legacy data, stored in a flat file format, to XML. The conversion of a flat file to an XML format requires proper representation of the data embedded in the flat file in some template form so that it can be converted to XML.

One way to accomplish this task is by hand, simply copying the flat file data into a new XML documents. This is unwieldy for large files and prone to human error. Another current method to convert flat files to XML documents is to write complex scripts in languages such as Perl. These scripts attempt to parse the flat file data and create a new XML file with the flat file information properly tagged and in the correct hierarchical structure. This method is also unsuitable for large and complex flat file data, as developing and debugging the scripts takes significant time and resources.

Another approach is taken by commercial software products that convert flat files to XML instances based on proprietary templates and conversion routines. These approaches are deficient in that they rely upon closed-format, proprietary technology that a developer must first have access to, and then learn, before implementing a solution. In addition, these approaches are not tailored to meet specific needs and often do not scale to fit the requirements of generic flat file-to-XML instance generation.

Consequently, there is a need for an improved technique that does not suffer from the shortcomings previously described.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a table illustrating a list of main control attributes required to build the parsing logic in the schema, according to one embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An XML schema defines the structure, content, and semantics of the data contained in XML documents. Flat files contain data, and in order to convert the data to XML, the underlying data structure and data validation rules are represented within an XML schema. An XML schema may conform to the XML Schema standard, a well-known standard promulgated by the W3C. There are various XML parsers available to parse and validate documents against XML schema that conform to this standard. Moreover, this approach provides the flexibility of describing the data more effectively using the schema language or standard maintained by a standards body, such as the W3C. An XML instance is XML data that conforms to the schema definition of an XML schema. XML data is data delimited with tags according to the XML standard.

In order to parse a flat file to create an XML instance, information about the data structure of the flat file and its hierarchy is captured in an XML schema. Once the data structure is defined by the XML schema, the parsing instructions for the flat file are introduced in the XML schema. From this XML schema, a skeletal XML instance, referred to as a default XML instance, is generated. In one embodiment, after producing an XML instance from a schema definition, the instance may be populated with live data from the flat file with the help of control attributes described in the schema. While various embodiments permitting conversion of flat file data are described herein, this approach also may be used to convert any data, such as sound or video, to XML format.

Data Representation

Figure 1:
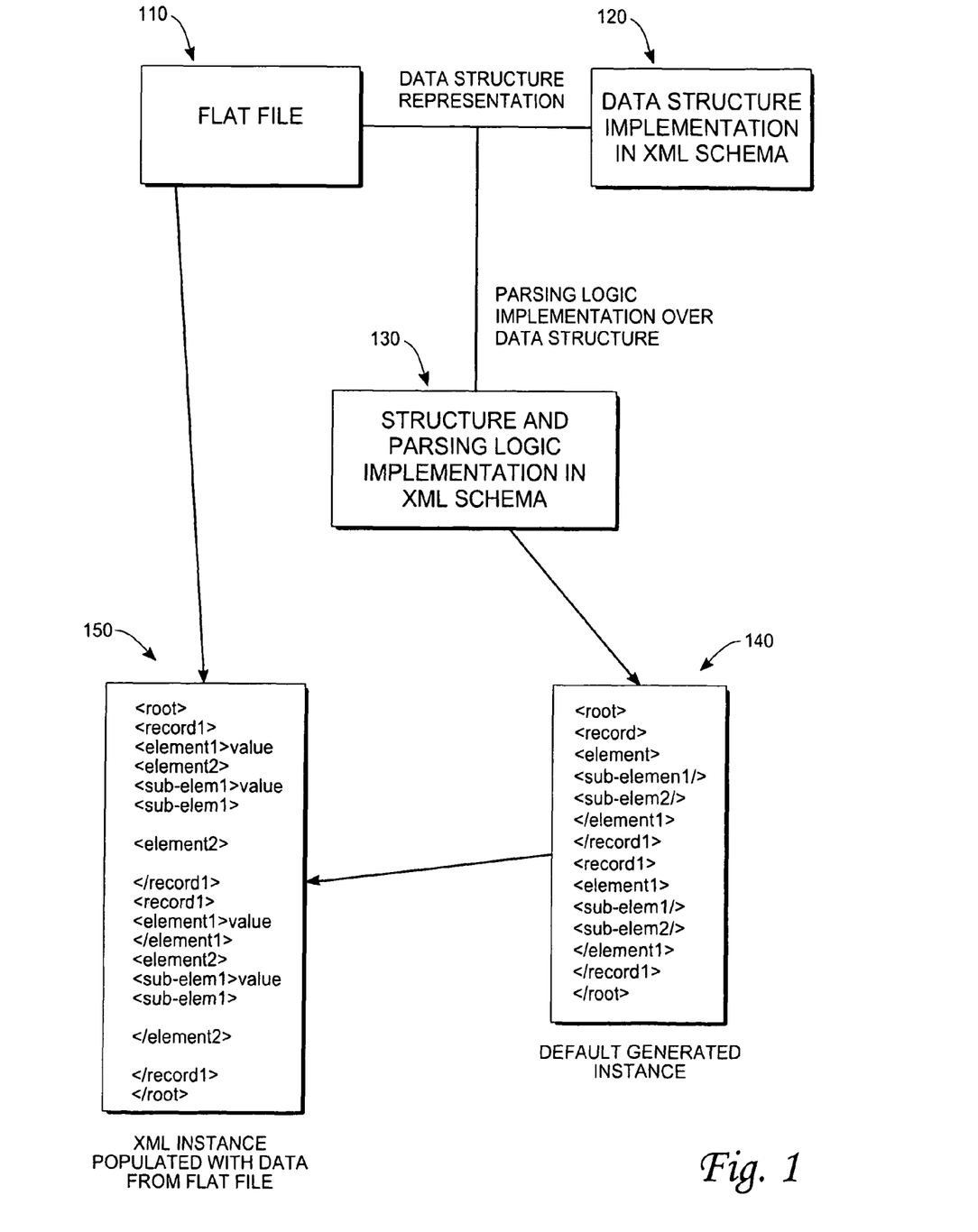
FIG. 1 is a block diagram illustrating the steps of generating xml instances from flat files, according to an embodiment.

FIG. 1 is a block diagram that illustrates an embodiment of the invention. In order to generate an XML instance from a flat file, the flat file 110 is represented in data structure schema 120, an XML schema with information on data structure and validation. In one embodiment of the invention, the flat file 110 is in the form of a delimited flat file format. A comma-delimited flat file format as envisioned in the embodiment is presented in FIG. 2. While the specific delimited file in FIG. 2 comprises commas as the delimiter to differentiate between fields, other embodiments are envisioned, such as delimiters comprising semicolons, periods, or other representative characters.

Figure 2:
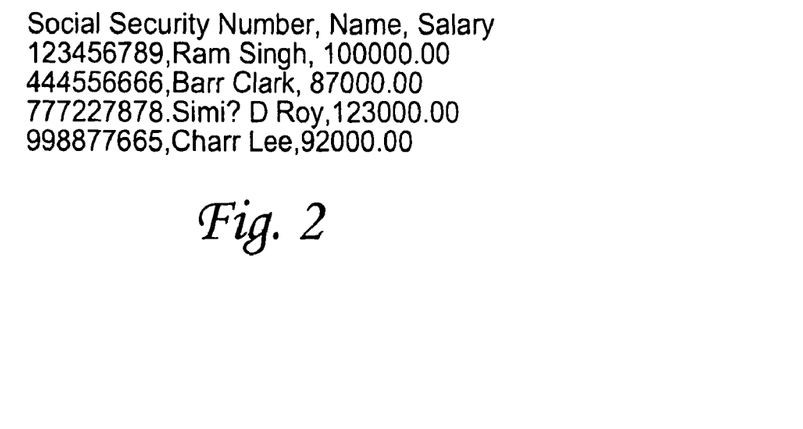
FIG. 2 is a table illustrating a comma-delimited flat file format, according to an embodiment.
Figure 3:
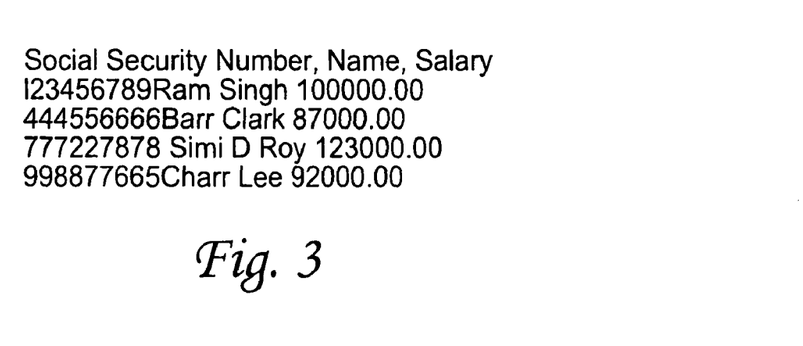
FIG. 3 is a table illustrating a fixed-length flat file format, according to an embodiment.

Another embodiment of the invention consists of the delimited flat file format utilizing fixed-length fields, or objects. FIG. 3 illustrates such a flat file format according to an embodiment of the invention. FIGS. 2 and 3 will be utilized henceforth to illustrate various implementations of the invention.

Conversion of data from a flat file format to an XML instance requires proper understanding of the underlying flat file data structure, as discussed above and illustrated in FIGS. 2 and 3. This understanding allows the structure to be captured as an XML schema. The purpose of an XML schema is to define and describe a class of XML documents by using schema declarations to constrain and document the meaning, usage and relationships of their constituent parts: datatypes, elements and their content, and attributes and their values. XML schemas may also provide for a specification of additional document information, such as normalization and defaulting of attribute and element values. XML schemas have facilities for self-documentation. Thus, XML schemas can be used to define, describe and catalogue XML vocabularies for classes of XML documents.

Any application that processes well-formed XML can use XML schema formalism to express syntactic, structural and value constraints applicable to its document instances. The XML schema formalism allows constraint checking to be described and implemented for a wide spectrum of XML applications.

An XML schema consists of components such as type definitions and element declarations. These can be used to assess the validity of well-formed elements and attribute information items, and furthermore may specify augmentations to those items and their descendants. This augmentation makes explicit information which may have been implicit in the original document, such as normalized and/or default values for attributes and elements and the types of element and attribute information items.

Figure 4:
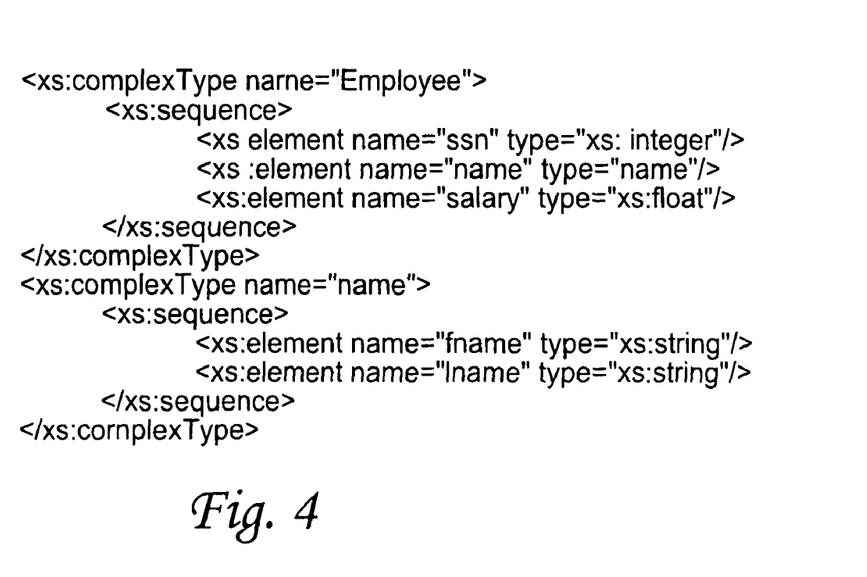
FIG. 4 is a table that illustrates a schema definition using element and complex type for the cases, according to one embodiment of the invention.
Figure 5:
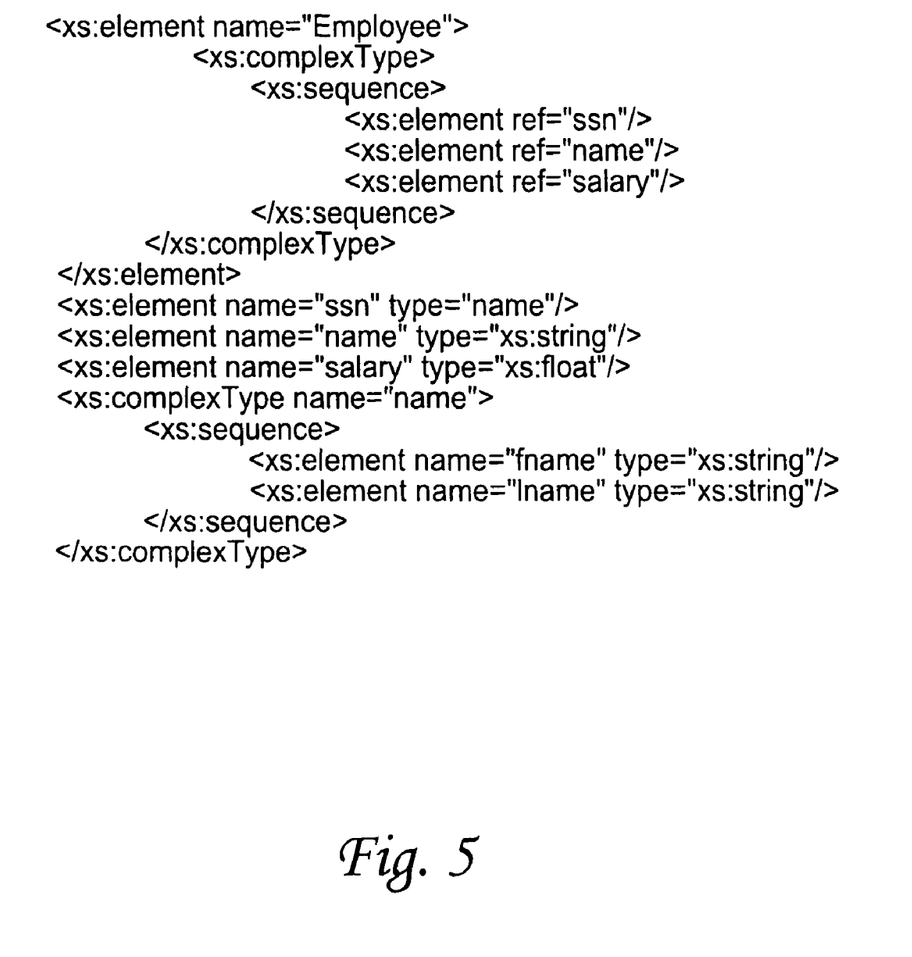
FIG. 5 is a table that illustrates a schema definition using element and element references for the cases, according to one embodiment of the invention.

FIG. 4 is a block diagram that illustrates an XML schema using element and complex type for the cases, according to one embodiment of the invention. FIG. 5 is a block diagram that illustrates an XML schema using element and element references for the cases, according to one embodiment of the invention.

According to one embodiment of the invention, either of the schema representations illustrated in FIGS. 4 and 5 may be adopted. Both representations illustrate the flexibility to describe the data structure using the W3C schema language and the capability of the approach to cater to any schema representation.

Parsing Logic Implementation

Referring back to FIG. 1, to parse the flat file 110 and populate a default XML instance, parsing logic 130 is added to the data structure implementation in XML schema 120 to generate the structure and parsing logic 130, according to one embodiment of the invention.

In one embodiment, annotations and control attributes with namespace, xmlns:t2xml="http://xmlns.oracle.com/t2xml" are introduced. These control attributes and annotations are added in the element declarations in XML schema 120, for example, by a human user to mark the XML root element, physical container definition (records), and contained objects (fields) as per the flat file structure. FIG. 6 is a table illustrating a list of main control attributes required to build the parsing logic in the schema, according to one embodiment of the invention. The listing of control attributes in FIG. 6 is not exhaustive, as control attributes may be added or removed according to various embodiments of the invention.

In one embodiment of the invention, the attributes minOccurs and maxOccurs are involved in determining repetitions of containers (or records); depending upon the value of the minOccurs and maxOccurs, the optional and required containers are decided. For example, if minOccurs is "0," the container is optional; if it is more than "0," the container is mandatory. If maxOccurs is "unbounded," the number of containers is decided depending upon the records in the actual flat file. However, if a number is prespecified in the schema, that number of records is anticipated to be in the flat file.

One embodiment of the invention is hereby illustrated wherein control attributes as discussed above are used in the schema to mark parsing logic instruction for a comma-delimited flat file (illustrated in FIG. 2). Considering the following record from FIG. 2:

777227878,Simi? D Roy,123000.00

Figure 7:
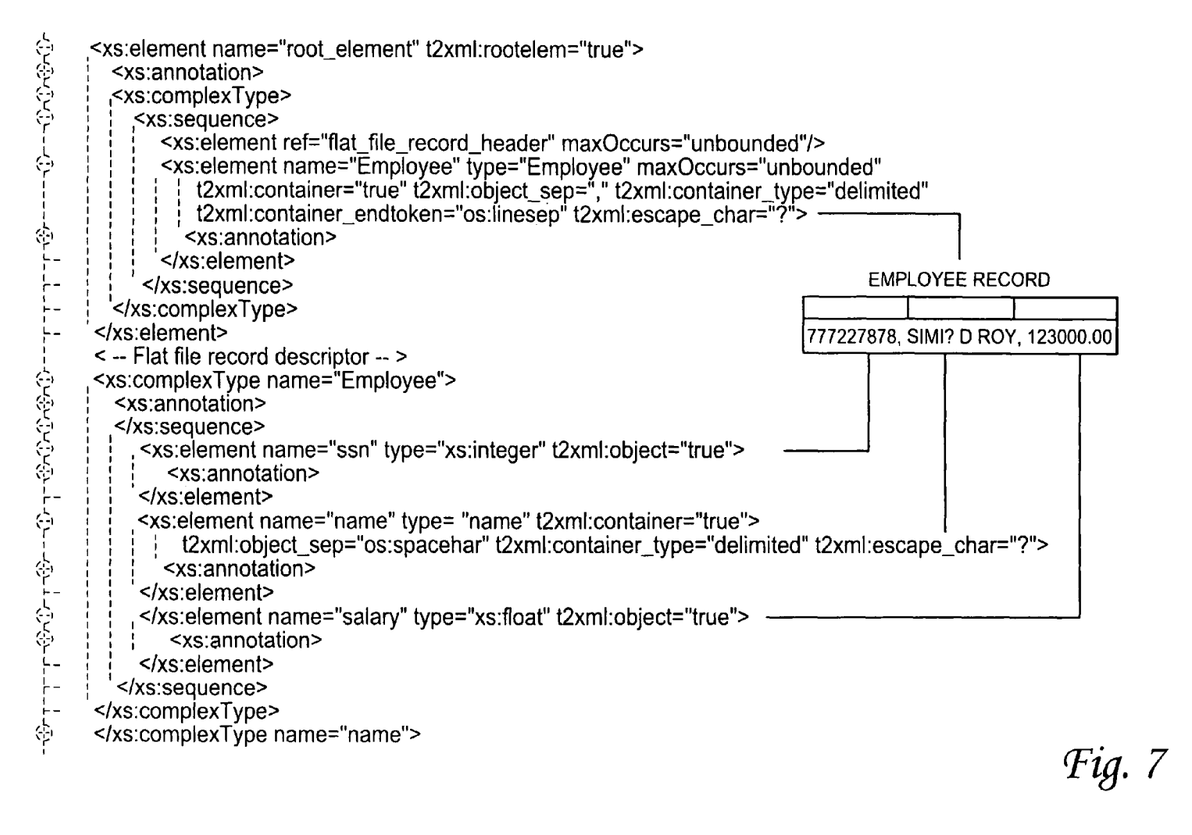
FIG. 7 is a table illustrating a basic mapping for a delimited record to a schema definition, according to an embodiment of the invention.

This shows an employee record with three fields: Social Security Number (SSN), name, and salary. The name field can be subdivided into first name and last name and separated by a " " delimiter. The "?" is considered an escape character in the name field. FIG. 7 is a listing illustrating a basic mapping for a delimited record to a schema, according to an embodiment of the invention.

In FIG. 7, the full record is mapped to the Employee element. Since the record is a delimited one, the following control attributes are added to the Employee element:

t2xml:container="true": Added to denote if it is a container or record.

t2xml:object_sep=",": Added to denote the field delimiter.

t2xml:container_type="delimited": Added to denote the record type is delimited.

t2xml:container_endtoken="os:linesep": Added to denote the OS-specific line separator is used as a record terminator.

t2xml:escape_char="?": Added to denote the escape character in the record definition.

Apart from these control attributes, maxOccurs="unbounded" is found in the Employee element declaration. This indicates to produce as many Employee elements as are encountered in the flat file.

The SSN and salary fields are contained within the Employee container and do not have any additional contained objects inside. The following control attribute is added for them:

t2xml:object="true": Added to denote that it is a contained object.

The name field contains the subfield's first name and last name. It is a container, as well as a contained object itself. In one embodiment of the invention, the following control attributes are added for it:

t2xml:container="true": To denote if it is a container for first name and last name.

t2xml:object="true": To denote if it is also a contained object inside Employee.

t2xml:object_sep="os:spacechar": To denote the OS-specific space character as delimiter.

t2xml:container_type="delimited": To denote the Container type as delimited.

t2xml:escape_char="?": To denote the escape character.

Turning to FIG. 3, one embodiment of the invention is hereby illustrated wherein control attributes as discussed above are used in the schema to mark parsing logic instruction for a fixed-length flat file. Considering the following record from FIG. 3:

777227878Simi? D Roy 123000.00

In one embodiment of the invention, the fixed-length field case is similar to the delimited case; a difference being that in the fixed-length case, the field lengths are fixed and not separated by any delimiters. Therefore, the control attributes for the Employee element are different from those of the delimited case, and may be expressed as follows according to one embodiment of the invention.

t2xml:container="true": Added to denote it is a container or record.

t2xml:container_type="fixed": Added to denote the record type is fixed.

t2xml:container_endtoken="os:linesep": Added to denote the OS-specific line separator is used as a record terminator.

In one embodiment of the invention, the attributes t2xml:object_sep and t2xml:escape_char are not used as they are specific to the delimited case only.

In one embodiment of the invention, for the contained objects there is an additional attribute to specify the object length. The respective lengths of the ssn, name, and salary fields were updated in the t2xml:object_len attribute. So, for contained objects the following are the required attributes according to one embodiment of the invention:

t2xml:object="true": Added to denote it's a contained object.
t2xml:object_len="9","30","9": For ssn, name, and salary fields.

In one embodiment of the invention, for the name field, mapping the other control attributes remains the same as in the delimited case.

Default Instance Generation

Referring back to FIG. 1, according to an embodiment of the invention, a default XML instance 140 that follows the rules defined in the schema 130 is generated based on the schema defined for the flat file data structure 120. A default XML instance has tags and elements, but no element or attribute values. Generating this default XML instance 140 from the schema 130 requires the proper identification of the root element to start the instance generation. In one embodiment of the invention, this XML instance generation from the schema is defined in an object class (e.g., Java class) implementing the Open Source Apache Xerces parser. This class should generate an XML instance from any schema definition, provided the schema contains at least one element declaration.

If there is more than one element declaration, the element with no reference from other elements is treated as a candidate for the root element. In one embodiment of the invention, a generic root element finder is implemented in a class implementing the Open Source Apache Xerces parser. The XML instance generation starts with the root element and comes up with XML elements on traversal of complex types and elements defined in the root element definition. It converts each complex type/simple type element to a default XML instance node during schema traversal.

In one embodiment of the invention, some control attributes are optional. At least one default element is produced. In one embodiment of the invention, if some elements have maxOccurs="unbounded," a default value is used for this attribute.

Populating the Default XML Instance With Data

Referring back to FIG. 1, according to one embodiment of the invention, populating the XML instance with data 150 comes after the default XML instance 140 is generated. According to one embodiment of the invention, the XML instance with data 150 is generated from the default generated instance 140 and the data contained in the flat file 110.

In one embodiment, the XML instance to be filled up with data does not go on with the whole schema definition at one time; rather, each schema element contained in the schema definition under the root element is converted to the XML element and then filled up with data. When the XML instance generation starts from the root element, the control attributes are examined for each schema element that is generated as XML.

In one embodiment of the invention, these control attributes indicate if an element is a container or contained object, and also provide information about the container end token, object separator, etc. Depending upon the control attributes, after the XML instance is generated for a particular schema element, the physical record is read from the flat file and the instance is populated with live data from flat file. This process is repeated for each record defined in the flat file. According to an embodiment of the invention, only after traversal of the full schema definition, starting from the root element, will a filled-up instance representing the full schema be created. If the maxOccurs attribute is "unbounded" for a schema element, the number of XML instances for this element is created as per the availability of records in the flat file; otherwise the actual number is regarded in the schema definition.

According to an embodiment of the invention, the lookup for the control attributes, and their correct handling, is of importance when filling the XML instance with data. In one embodiment of the invention, all control attributes used are defined in an interface. Depending upon the need of the application, few or all of these attributes might be changed and implemented. In one embodiment of the invention, the main class used to generate xml instances from flat files implements an interface having definitions of all control characters used, and extends a class having the functionality of creating a default xml instance given a schema.

In one embodiment of the invention, basic XML elements are generated in one class, but in the derived instance, with the help of another class, these XML instances are filled up with data from the flat file.

In one embodiment of the invention, methods in the class skeleton are overridden to maintain reusability of the sample implementation so that anyone using these classes can easily plug in new functionality.

In one embodiment of the invention, a method is overridden to find the root element in accordance with the control attribute "t2xml:rootelem." To locate the root element in any other embodiment, the control attribute might be changed.

In one embodiment of the invention, a method is overridden to look up specific control attributes for container and container type, so that the filler object that fills the data to the generated XML instance is set up properly.

In one embodiment of the invention, a method is overridden to fill up data in the XML instance based on the control attribute for object marking and the type of filler object passed in.

In one embodiment of the invention, the other methods in the class are helper methods to get the instance fill-up mechanism working.

Hardware Overview

Figure 8:
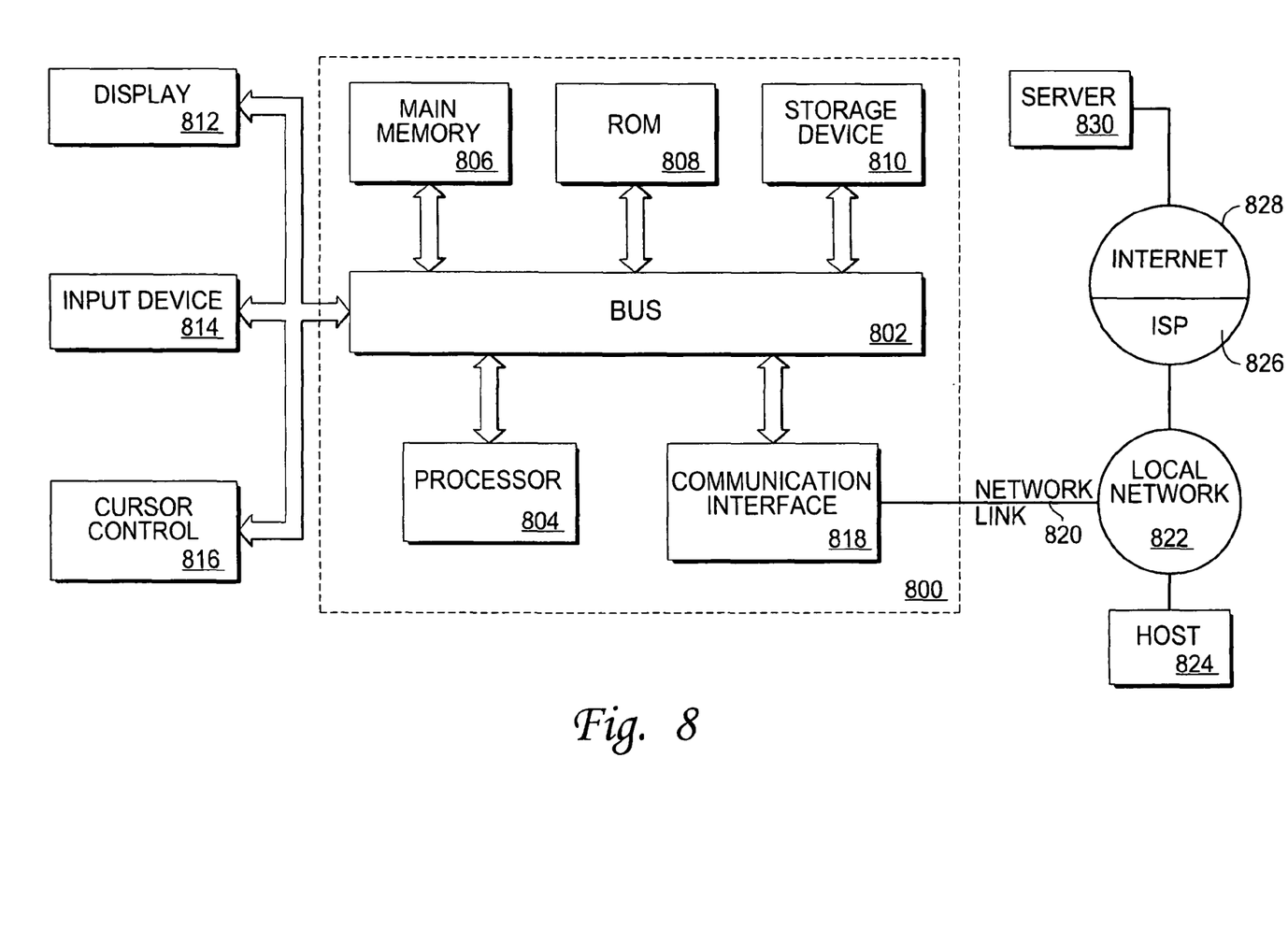
FIG. 8 is a block diagram that illustrates a computer system upon which an embodiment of the invention may be implemented.

FIG. 8 is a block diagram that illustrates a computer system 800 upon which an embodiment of the invention may be implemented. A computer system as illustrated in FIG. 8 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for containing and/or playing digital video. Hence, all of the components that are illustrated and described in reference to FIG. 8 are not necessary for implementing embodiments of the invention.

Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, optical disk, or magneto-optical disk, is provided and coupled to bus 802 for storing information and instructions.

Computer system 800 may be coupled via bus 802 to a display 812, such as a cathode ray tube (CRT) or a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media; and volatile media. Non-volatile media includes, for example, optical, magnetic, or magneto-optical disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for converting a body of data records to an XML format, wherein each record of said body of data records conforms to a same record format, said record format comprising record fields and an ordering among said record fields, each record field of said record fields belonging to a data type, wherein no record of said body of data records conforms to XML, wherein the method comprises:

generating a target XML schema document that includes declarations that both describe the record format and describe said XML schema of XML instances to which to convert said body of data records;

for each record field of said record fields, the declarations describe the respective data type of the record field and the order of the record field in said ordering among the record fields;

based on the body of data records and the XML schema, generating an XML instance that conforms to the XML schema;

wherein the method is performed by one or more computing devices.

2. The method of claim 1, wherein the body of data records is a flat file in a delimited format.

3. The method of claim 1, wherein the body of data records is a flat file in a fixed-length format.

4. The method of claim 1, wherein the body of data records is a flat file in ASCII text.

5. The method of claim 1, wherein the XML instance is a Java instance.

6. The method of claim 1, wherein the XML instance is a non-Java compatible instance.

7. The method of claim 1, wherein the XML schema comprises container definitions.

8. The method of claim 1, further comprising generating a default XML instance and then populating the default XML instance with data.

9. The method of claim 1, further comprising generating an XML schema with parsing information.

10. The method of claim 1, wherein the XML schema comprises contained objects.

11. The method of claim 1, wherein the XML schema comprises control attributes, wherein the control attributes indicate how to parse said body of data records.

12. The method of claim 11, wherein the generating of the XML instance comprises:

examining the control attributes;

reading a physical record from the body of data records; and placing the value of the physical record into the XML instance in accordance with the control attributes.

13. A non-transitory computer-readable medium storing one or more sequences of instructions which, when executed by one or more processors, causes the one or more processors to perform a method of converting a body of data records to an XML format, wherein each record of said body of data records conforms to a same record format, said record format comprising record fields and an ordering among said record fields, each record field of said record fields belonging to a data type, wherein no record of said body of data records conforms to XML, wherein the method steps executed by the one or more processors comprise:

generating a target XML schema document that includes declarations that both describe the record format and describe said XML schema of XML instances to which to convert said body of data records;

for each record field of said record fields, the declarations describe the respective data type of the record field and the order of the record field in said ordering among the record fields;

based on the body of data records and the XML schema, generating an XML instance that conforms to the XML schema;

wherein the method is performed by one or more computing devices.

14. The non-transitory computer-readable medium of claim 13, wherein the body of data records is a flat file in a delimited format.

15. The non-transitory computer-readable medium of claim 13, wherein the body of data records is a flat file in a fixed-length format.

16. The non-transitory computer-readable medium of claim 13, wherein the body of data records is a flat file in ASCII text.

17. The non-transitory computer-readable medium of claim 13, wherein the XML instance is a Java instance.

18. The non-transitory computer-readable medium of claim 13, wherein the XML instance is a non-Java compatible instance.

19. The non-transitory computer-readable medium of claim 13, wherein the XML schema comprises container definitions.

20. The non-transitory computer-readable medium of claim 13, further comprising instructions for generating a default XML instance and then populating the default XML instance with data.

21. The non-transitory computer-readable medium of claim 13, further comprising instructions for generating an XML schema with parsing information.

22. The non-transitory computer-readable medium of claim 13, wherein the XML schema comprises contained objects.

23. The non-transitory computer-readable medium of claim 13, wherein the XML schema comprises control attributes, wherein the control attributes indicate how to parse said body of data records.

24. The non-transitory computer-readable medium of claim 23, wherein the instructions for generating of the XML instance comprises:
    examining the control attributes;
    reading a physical record from the body of data records; and
    placing the value of the physical record into the XML instance in accordance with the control attributes.

\* \* \* \* \*

UNITED STATES PATENT AND TRADEMARK OFFICE
CERTIFICATE OF CORRECTION

| | | |
|---|---|---|
| PATENT NO. | : 8,024,368 B2 | Page 1 of 1 |
| APPLICATION NO. | : 11/297172 | |
| DATED | : September 20, 2011 | |
| INVENTOR(S) | : Indroniel Deb Roy and Shinji Yoshida | |

It is certified that error appears in the above-identified patent and that said Letters Patent is hereby corrected as shown below:

Title page, please insert

Item -- [60] Related Application Data - India application no. 930/KOL NP/2005 filed on October 7, 2005. --

Signed and Sealed this
Twenty-second Day of November, 2011

David J. Kappos
*Director of the United States Patent and Trademark Office*